Aug. 17, 1926.
1,596,205
J. MASSON
FOOD AND MEAT GRINDING MACHINE
Filed June 24, 1925
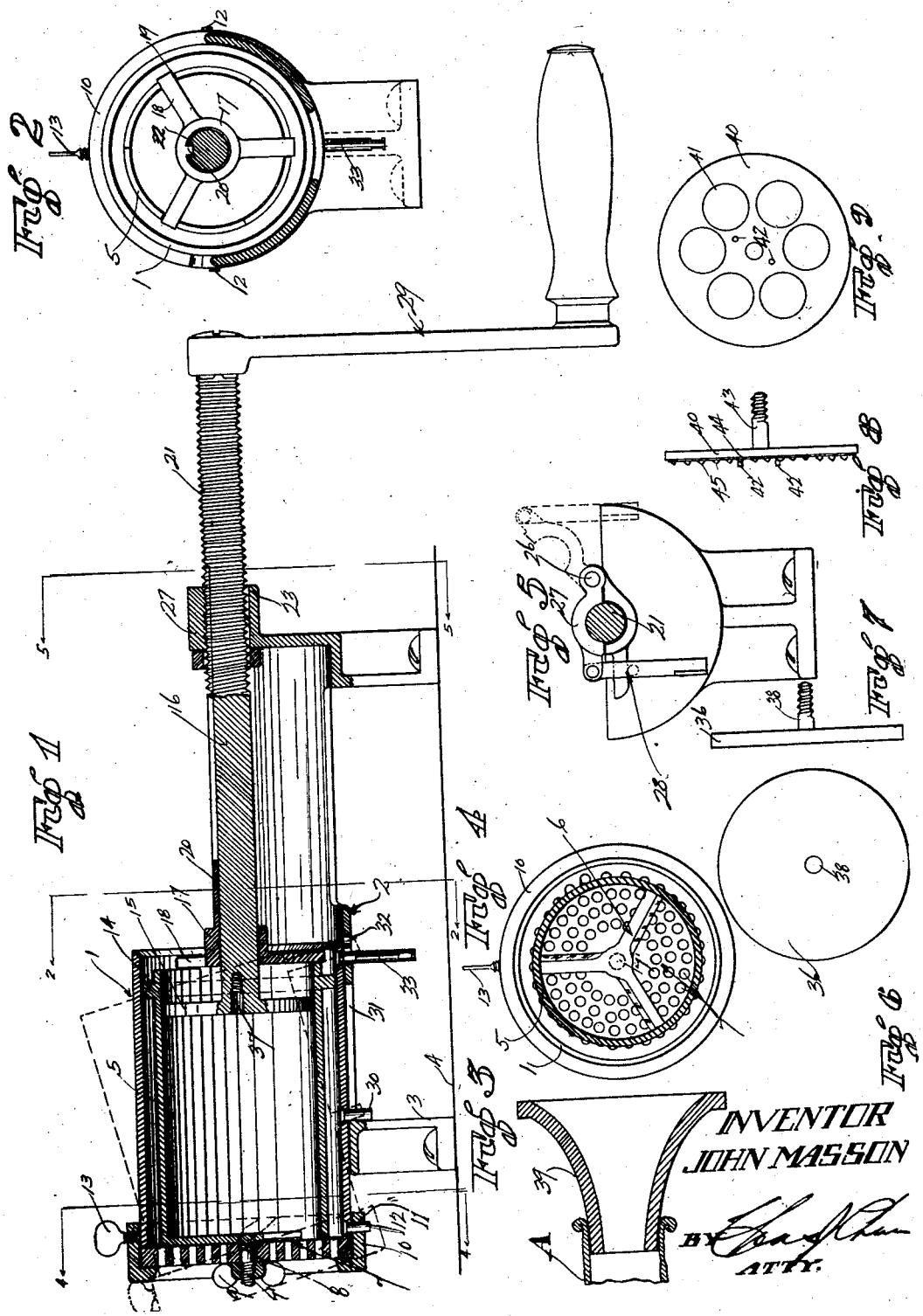
INVENTOR
JOHN MASSON
BY
ATTY.

Patented Aug. 17, 1926.

1,596,205

UNITED STATES PATENT OFFICE.

JOHN MASSON, OF SAN FRANCISCO, CALIFORNIA.

FOOD AND MEAT GRINDING MACHINE.

Application filed June 24, 1925. Serial No. 39,246.

This invention resides in the provision of a compact, comparatively small and highly useful household utensil which may be used as a food and meat grinder, as a sausage stuffer and as a bread and cheese grater, and may also be put to other similar uses.

One of the objects of the invention is to provide a simply constructed, inexpensive machine of the character described which may be readily and easily operated to grind or otherwise treat large quantities of meat or other foods in a comparatively short time.

Another object of the invention is to provide a grinding machine of the character described which will be strong, durable and subject to operation to cut or reduce meat or other foods into small particles without jamming of the apparatus or an objectionable back-slippage of the meat or other foods, past the plunger.

A further object of the invention is to provide a machine of the character described which may be operated in a smooth and expeditious manner without requiring the expenditure of a great deal of energy regardless of the character or amount of the food being treated.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:—

Fig. 1 represents a longitudinal sectional view taken through a machine constructed in accordance with the invention.

Fig. 2 represents a sectional view taken on the plane of line 2—2 of Fig. 1.

Fig. 3 represents an enlarged sectional view of the sausage filling nozzle showing a part of the sausage casing thereon.

Fig. 4 represents a sectional view taken on the plane of line 4—4 of Fig. 1.

Fig. 5 represents a sectional view taken on the line 5—5 of Fig. 1.

Fig. 6 represents a top plan view of the plunger or piston head as used when filling sausages.

Fig. 7 represents a side elevation of the plunger shown in Fig. 6.

Fig. 8 represents a side elevation of the bread and cheese grating plunger.

Fig. 9 represents a top plan view of a part of the plunger shown in Fig. 8, the corrugated grating disk being removed.

The embodiment of the invention shown in the accompanying drawing comprises a body portion 1 in the present instance in the form of a cylinder, adapted to be supported on a semi-cylindrical stand 2, having legs 3 subject to attachment to a suitable support indicated at 4. Mounted within the cylinder 1 is an operating cylinder 5 carrying at one end a three bladed cutter 6 and being open at its other end. The blades of the cutter 6 are adapted to engage against a perforated head 7 for the cylinder 1. A trunnion 7' projecting outwardly from the center of the cutter 6 is rotatably engaged in an opening 8 in the center of the head 7. The outer end of this trunnion is screw threaded and has a wing nut 9 thereon to hold the cutter, also the cylinder 5 in assembled relation. The head 7 is removably held in place against the adjacent end of the cylinder by means of a flanged clamping ring 10. This ring is provided with angularly extending slots 11 adapted to receive lugs 12 projecting outwardly from the cylinder 1. To hold the ring 10 against turning, a set screw 13 is carried by the ring and arranged to bear against the cylinder 1. The cylinder 5 is spaced circumferentially from the cylinder 1 except as regards an annular bearing rib 14 located adjacent the open end of the cylinder and which bears upon the inner surface of the cylinder 1. Meats or other foods to be ground or reduced are placed in the cylinder 5 and forced against the cutter 6 and perforated head 7. On rotation of the cylinder 5 the cutter 6 turns and operates together with the perforated head 7, to reduce or cut the food, the pressure causing the food to be forced through the perforations, the divided parts being of uniform size and appearance.

To provide for rotating the cylinder and cutter and feeding or forcing the material against the perforated head 7, I employ a piston-like plunger 15 having a working fit in the cylinder 5 and carried on one end of a screw shaft 16. The shaft 16 has a sliding fit in a bearing 17 which is located against the open end of the cylinder 5. This bearing is provided with radial arms 18 which are received in recesses or notches 19 cut in the adjacent end of the cylinder 5. On the bearing 17 is a key 20 adapted to slidably engage in a key-way 21 extending longitudinally in the shaft 16. Part of the shaft is provided with screw threads 22 and this screw threaded portion is supported in a smooth bearing 23 provided at the adjacent end of the support 2. The bearing 23 is semi-cylindrical and has pivoted on its upper side as at 24, a semi-cylindrical nut 27 adapted to cooperate with the screw threads of the shaft. When this nut is in position to engage the screw threads it may be locked in such position by a suitable clasp 28 and on rotation of the shaft, the plunger 15 is advanced or withdrawn dependent on the direction of the rotation of the shaft, and the cylinder 5 is rotated due to the connection of the bearing 17 through the arms 18 with the cylinder. In the present instance, the machine is adapted for manual operation through the provision of an operating crank 29 to provide for filling the cylinder 5 or the cylinder 1, dependent on the use of the machine. The cylinder 1 is removably adjustably mounted in the stand 2. Projecting from the lower side of the cylinder 1 between its ends, is a lug 30 which engages in a slot 31 in the bottom of the stand 2. Forward of the slot 31 is a key hole slot 32 through which a comparatively long lug or pin 33 carried by the cylinder 1, extends. This pin assists in holding the cylinder 1 in tilted position as shown in dotted lines, Fig. 1, whereby access to the filling end of the cylinder is readily had.

To operate the device as a meat or food cutter or grinder, employing the cylinder 5, the plunger 15 together with the bearing 17 are withdrawn from the cylinder 5 so that said cylinder may be filled with material to be treated. The cylinders 1 and 5 are moved forward sufficient to free the pin 33 and permit of the tilting of the two cylinders into dotted line position shown in Fig. 1. In this position the pin 33 acts as a support or recess to maintain the tilted position. The material may be readily placed in the cylinders when in this position and following the packing of the cylinder 5 with material to be treated, it is adjusted to horizontal position on the stand and the plunger 15 and bearing 17 move back into operative relation to the cylinder, the piston 15 being extended into the open end of the cylinder and the arms 18 of the bearing 17 being engaged against certain ends or walls of the slots 19. With the end 27 held in engagement with the screw threads of the shaft 16, on turning the crank 29, the shaft is advanced while being rotated causing the plunger 15 to press the food, meat, or other material, against the cutter 6 and perforated head 7. The connection between the bearing 17, shaft 16 and cylinder 5 is such as to cause the cylinder 5 to rotate during the advancement of the piston or plunger 15 therein and thus the knives of the cutter 6 operating close against the perforated head 7, cut the material as it is being forced through the perforations in the head and cause the divided particles to be exuded or forced through in uniformly sized pieces. It will thus be seen that a comparatively large quantity of meat or other material to be ground or reduced, may be quickly and easily ground or reduced with the apparatus of the invention, it only being necessary to continuously rotate the shaft 21. The operation of the cutter may be easily and smoothly effected due to the particular construction and relative arrangement of the parts of the invention, there being no back-slippage of the meat or other material past the plunger. The manner of mounting the inner cylinder provides for a well balanced, simple operation and eliminates all possibility of jamming of the apparatus.

The device of the invention is constructed so that it will contain a comparatively large amount of material to be treated and the entire structure yet may be comparatively small and compact. In this way it constitutes considerable of an improvement over the ordinary meat grinder in which the material must be evenly fed or placed therein.

To use the apparatus as a sausage filling machine, the inner cylinder 5 is removed and a larger piston head or plunger 36 as shown in Figs. 6 and 7, is screwed into place against the piston plunger 15. A screw threaded opening 37 is provided in the center of the plunger 15 to receive a screw threaded member 38 on the head 36. The head 36 is of sufficient diameter to have a working fit inside the cylinder 1. The perforated head 7 is removed by loosening the set screw 13 and turning the clamp ring 10, to move the pins 12 out of the slots 11. On freeing the head 10, said head together with the inner cylinder 5 may be readily removed from the cylinder 1. A sausage filling nozzle or discharge spout 39 as shown in Fig. 3, is then clamped in place in the cylinder 1 by means of the clamp ring 10, and is constructed so that the casing of a sausage as shown at A, may be fitted over the discharge end thereof. The sausage filling nozzle is placed in the main cylinder 1 and on moving the shaft 16 with the plunger 36 into said cylinder, on rotation of the shaft 16 with the nut 27 in place, provision is made for forcing the sausage filling through the spout 37 into the casing A.

To provide for use of the device as a bread and cheese grater, the perforated head 7 is maintained in place but the cylinder 5 is removed. In place of the imperforate disk on the plunger 36, I employ a plunger head 40 having a series of large openings 41 therein, provided on opposite sides of the center with lugs 42. Extending from the opposite face of the plunger 40 is a screw threaded stud 43 adapted to be turned into the opening 37. The member 40 has a working fit with the cylinder 1 and is adapted to support on its front face a thin perforated disk 44 having a plurality of pointed projections 45 extending from the edges of the perforations and thereby constituting a grating element. This disk is provided with openings through which the lugs 42 project in order to hold it on the plunger 40. After placing bread or cheese in the cylinder 1 and removing the plunger 40 with the grater element thereon into the cylinder so as to bear against the bread or cheese, on turning the shaft 16, the grating element will cause particles of the bread or cheese to pass through the perforations therein and out through the openings 41 and collect in the cylinder back of the plunger from which point it may be readily scraped out into a dish or other receptacle, not shown.

The machine of my invention operates with considerably less friction than other meat and food grinders, thus making for smoothness and ease of operation.

I claim:—

1. A machine of the character described comprising a support, a cylinder rotatably mounted on the support, a perforated plate with which one end of the cylinder rotatably engages, a cutter carried by the cylinder and engaging against the inner side of the perforated plate, a plunger having a working fit in the cylinder, a rotatable shaft to which said plunger is connected, means providing for advancement of the shaft and plunger on rotation thereof, means of connection between the shaft and cylinder providing for rotation of the cylinder simultaneously with the rotation and advancement of the shaft and plunger.

2. A machine of the character described comprising a support, a cylinder rotatably mounted on the support, a perforated plate with which one end of the cylinder rotatably engages, a cutter carried by the cylinder and engaging against the inner side of the perforated plate, a plunger having a working fit in the cylinder, a rotatable shaft to which said plunger is connected, means providing for advancement of the shaft and plunger on rotation thereof, means of connection between the shaft and cylinder providing for rotation of the cylinder simultaneously with the rotation and advancement of the shaft and plunger and means for detachably holding the said perforated plate against the open end of the cylinder.

3. A machine of the character described comprising a support, a cylinder rotatably and tiltably mounted on the support, a perforated plate against one side of which one end of the cylinder rotatably engages, a plurality of cutting blades carried by and rotating with the cylinder against said perforated plate, a trunnion extending from said blades through said plate, a fastening element associated with the trunnion and engaging the outside of the plate, a plunger reciprocally mounted in the cylinder, a rotatable shaft to which said trunnion is affixed, means for rotating the shaft, means for causing the shaft to be moved longitudinally coincident with rotation thereof, and means of connection between the shaft and cylinder for rotating the latter.

4. A machine of the character described comprising a cylinder, a support for the cylinder, a perforated plate, means detachably holding the plate against one end of the cylinder, another cylinder rotatably mounted in the first cylinder and having one end engaging said perforated plate, a cutter carried and rotated with the cylinder against the inner face of said plate, a plunger reciprocally mounted within the cylinder, a rotatable shaft with which the plunger is connected, means causing said shaft to move longitudinally on rotation thereof and means of connection between the shaft and last named cylinder providing for rotation of the cylinder on rotation of the shaft.

JOHN MASSON.